(12) United States Patent
Duerr et al.

(10) Patent No.: US 11,171,580 B2
(45) Date of Patent: Nov. 9, 2021

(54) BRAKE SYSTEM AND CONTROLLER FOR USE WITH A WELLHEAD DIRECT DRIVE

(71) Applicant: GENERAL MAGNETIC INTERNATIONAL INC., Calgary (CA)

(72) Inventors: Al Duerr, Calgary (CA); Aaron Brassard, Calgary (CA); John Doyle, Calgary (CA); Wray Sparling, Calgary (CA)

(73) Assignee: General Magnetic International Inc., Calgary (CA)

( * ) Notice: Subject to any disclaimer, the term of this patent is extended or adjusted under 35 U.S.C. 154(b) by 348 days.

(21) Appl. No.: 15/538,455

(22) PCT Filed: Dec. 22, 2015

(86) PCT No.: PCT/CA2015/051364
§ 371 (c)(1),
(2) Date: Jun. 21, 2017

(87) PCT Pub. No.: WO2016/101074
PCT Pub. Date: Jun. 30, 2016

(65) Prior Publication Data
US 2017/0373613 A1 Dec. 28, 2017

Related U.S. Application Data

(60) Provisional application No. 62/095,935, filed on Dec. 23, 2014.

(51) Int. Cl.
*H02P 3/22* (2006.01)
*H02H 5/04* (2006.01)
(Continued)

(52) U.S. Cl.
CPC ............... *H02P 3/22* (2013.01); *H02H 3/083* (2013.01); *H02H 5/043* (2013.01); *H02H 7/20* (2013.01);
(Continued)

(58) Field of Classification Search
CPC . H02P 27/045; H02P 3/22; H02P 3/02; H02H 3/083; H02H 5/043; H02H 7/20
(Continued)

(56) References Cited

U.S. PATENT DOCUMENTS 4,233,549 A * 11/1980 Dighe ....................... H02P 7/29
388/819
6,078,156 A * 6/2000 Spurr ........................ H02P 3/08
318/368

(Continued)

FOREIGN PATENT DOCUMENTS

| CN | 2053246 | * | 4/2009 | |
| EP | 2053246 | * | 4/2009 | ............. F04C 28/06 |
| WO | 2006065957 | | 6/2015 | |

*Primary Examiner* — Kawing Chan
*Assistant Examiner* — Zemenay T Truneh
(74) *Attorney, Agent, or Firm* — Kyle R Satterthwaite; Ryan W Dupuis; Ade & Company Inc (57) ABSTRACT

The invention relates to fluid drive systems used in fluid wells and brake systems for permanent magnet wellhead direct drives. The braking controller connects or disconnects a brake resistor from a back EMF. A variable frequency drive (VFD) drives the motor and communicates with the control circuitry of the brake controller. The control circuitry monitors the brake resistor and depending on the rotational speed and direction of the motor and operating state of the VFD, disconnects or connects the brake resistor. If the direction of the motor is in reverse and above a threshold speed, it connects the brake resistor. If the direction of the motor is in reverse and below the threshold speed, the control circuitry dissipates stored back EMF through the brake controller. The amount of stored back EMF corresponds to the time to empty a pump.

22 Claims, 8 Drawing Sheets

(51) Int. Cl.
*H02H 7/20* (2006.01)
*H02P 3/02* (2006.01)
*H02H 3/08* (2006.01)
*H02P 27/04* (2016.01)
*F04C 2/107* (2006.01)
*F04C 14/28* (2006.01)
*F04C 15/00* (2006.01)

(52) U.S. Cl.
CPC .............. *H02P 3/02* (2013.01); *H02P 27/045* (2013.01); *F04C 2/107* (2013.01); *F04C 14/28* (2013.01); *F04C 15/008* (2013.01)

(58) Field of Classification Search
USPC ......................................................... 318/381
See application file for complete search history.

(56) References Cited

U.S. PATENT DOCUMENTS

| | | | | |
|---|---|---|---|---|
| 6,082,433 | A * | 7/2000 | Vafaie | E06B 9/68 160/310 |
| 2002/0011812 | A1* | 1/2002 | Yabe | B60S 1/08 318/443 |
| 2006/0290232 | A1* | 12/2006 | Fujita | H02K 21/044 310/263 |
| 2011/0017165 | A1* | 1/2011 | Osawa | F02N 11/0859 123/179.4 |
| 2012/0256575 | A1* | 10/2012 | Chien | H02P 6/182 318/400.35 |
| 2013/0340165 | A1* | 12/2013 | Dong | A61B 6/102 5/601 |
| 2014/0288758 | A1* | 9/2014 | Suzuki | B60L 15/2009 701/22 |

* cited by examiner

| VFD Run Contact | PM Motor Back EMF | Status |
|---|---|---|
| Closed | 0Vrms (Stationary) | Stand By - Disconnected |
| Closed | <50Vrms (Rotating below ~50rpm) Speed going up from long time period of stationary. | Stand By - Disconnected |
| Closed | <50Vrms (Rotating below ~50rpm) Speed going down before time delay | Stand By - Disconnected |
| Closed | <50Vrms (Rotating below ~50rpm) Speed going down after time delay | Stand By - Disconnected |
| Closed | >50Vrms (Rotating above ~50rpm) | Stand By - Disconnected |
|  |  |  |
| Open | Reverse Rotation: 0Vrms (Stationary) | Ready - Disconnected |
| Open | Reverse Rotation: <50Vrms (Rotating below ~50rpm) Speed going up from long time period of stationary. | Ready - Disconnected |
| Open | Reverse Rotation: <50Vrms (Rotating below ~50rpm) Speed going down before time delay | Operational - Connected |
| Open | Reverse Rotation: <50Vrms (Rotating below ~50rpm) Speed going down after time delay | Ready - Disconnected |
| Open | Reverse Rotation: >50Vrms (Rotating above ~50rpm) | Operational - Connected |
|  |  |  |
| Open | Forward Rotation: 0Vrms (Stationary) | Ready - Disconnected |
| Open | Forward Rotation: <50Vrms (Rotating below ~50rpm) Speed going up from long time period of stationary. | Ready - Disconnected |
| Open | Forward Rotation: <50Vrms (Rotating below ~50rpm) Speed going down before time delay | Ready - Disconnected |
| Open | Forward Rotation: <50Vrms (Rotating below ~50rpm) Speed going down after time delay | Ready - Disconnected |
| Open | Forward Rotation: >50Vrms (Rotating above ~50rpm) | Ready - Disconnected |

FIG. 5A

| Status | Meaning | Automobile Analogy |
|---|---|---|
| Stand By - Disconnected | Free to rotate | Foot on the gas |
| Ready - Disconnected | Brake Ready | Foot off the gas; ready to brake; coasting |
| Operational - Connected | Brake Engaged | Foot on the brake |

FIG. 5B

| Resistance | Meaning | Brake to VFD Contact Status |
|---|---|---|
| Resistance Normal | Isolated from Ground & Resistance Present | Stand By – Open |
| Resistance Value Not in Tolerance | Isolated from Ground but resistance abnormal | May be Active Fault – Closed |
| Resistance Shorted to Ground | Circuit is in contact with chassis | Active Fault – Closed |
| Resistance Open | No resistance present | Active Fault – Closed |

FIG. 6

| Electronic Brake Controller Fault Contact Status | Fault Test | Meaning |
|---|---|---|
| Stand By – Open | No fault found. | No fault found. |
| The following fault tests are evaluating the status of the brake resistor. The brake resistor is the element in the design where the energy absorbed while braking is directed and converted to heat. |||
| Active Fault – Closed | Open brake resistor. | Brake resistor is possibly disconnected or damaged.<br><br>No braking could result during braking event. |
| Active Fault – Closed | Shorted brake resistor. | Brake resistor is possibly damaged or connected improperly.<br><br>Excessive braking could result during braking event or voltage present on chassis during braking event.<br><br>The VFD is also expected to be able to sense this condition. |
| Active Fault – Closed | Abnormal brake resistance. | Brake resistor is possibly |

FIG. 7A

| Electronic Brake Controller Fault Contact Status | Fault Test | Meaning |
|---|---|---|
| | | damaged or connected improperly.<br><br>Abnormal braking could result during braking event. |
| The following fault tests are evaluating the status of the 3-phase rectifier. The rectifier is the device that converts the 3-phase AC voltage produced by the back EMF of the permanent magnet motor to DC voltage. |||
| Active Fault – Closed | Open rectifier. | Motor may not connect properly to the brake resistor during a braking event.<br><br>Braking event may be abnormal or no braking could occur. |
| Active Fault – Closed | Shorted rectifier. | VFD is expected to recognize a shorted circuit in 3-phase rectifier. |
| Stand By – Open | Line-to-line short (6 possible instances) | VFD is expected to experience an overload while running in normal mode for this condition. |
| The following fault tests are evaluating the status of the IGBT. The IGBT is the device that is controlled by the PCB to either connect or disconnect the DC voltage to the brake resistor. |||
| Stand By – Open | Open IGBT. | An open IGBT is expected to be difficult to detect as this symptom is electronically similar to a healthy IGBT.<br><br>A process whereby a logical test is performed on startup of the system with the VFD that manipulates the brake controller in unison with running the motor that can sense for a change of VFD load and subsequently recognize an IGBT that is open and subsequently healthy or not healthy. |
| Stand By – Open | Shorted IGBT. | VFD is expected to recognize a shorted circuit in the IGBT. |
| The following fault tests are evaluating the status of the brake resistor thermistor. The brake resistor thermistor senses whether or not the brake resistor is in an overheated state or not. |||
| Stand By – Open | Active PTC | The brake resistor is too hot to start a new braking event.<br><br>This is monitored by the VFD. When the brake resistor cools off, the VFD can resume normal operation. |

FIG. 7B

BRAKE SYSTEM AND CONTROLLER FOR USE WITH A WELLHEAD DIRECT DRIVE

FIELD OF THE INVENTION

The present invention relates generally to the field of drive systems and controllers used in fluid wells. More particularly, the present invention relates to a failsafe brake controller for permanent magnet wellhead direct drives.

BACKGROUND OF THE INVENTION

Resource extraction in the oil and gas industry often uses progressing cavity (PC) pumps positioned at the bottom of a well bore to produce fluid from the well. The PC pumps require low speed rotation by way of a rod string rotating within the well bore that supports the weight of the rod string, pump rotor, and fluid. As the torque in the rod string increases, twisting of the rod stores rotational energy in the rod. If this torque is suddenly removed, the release of the rotational strain energy in the rod can be violent. Braking must therefore be managed safely and effectively.

Certain braking systems make use of alternating current (AC) synchronous Permanent Magnet (PM) motor direct drives which produce back electromotive forces (EMF) or back EMF. When a PM motor is rotating, the PM electromagnetic circuit produces a back EMF. In this way, the PM motor acts as a generator. The back EMF is proportional to speed of the PM motor. As the speed approaches zero, the voltage also reduces to zero. This voltage may be connected to braking resistors to absorb rotating energy (e.g. to brake).

During braking, the rotational spring energy is first released. Once this event is complete, there is still fluid in the well bore and back spin continues. The brake manages both the release of the rotational tension, which happens very quickly, and the settling out of the fluid level in the well bore, which may take a long time. As long as the connection between the PM motor and the resistance is maintained, the system resists rotation. Since the resistance is constant, as the speed reduces the braking torque also reduces, and as the speed increases, the braking torque increases.

This bi-directional nature of electronic brakes results in the braking effect occurring when the drive is operating both in a forward direction and a reverse direction. One system is disclosed U.S. Pat. No. 8,283,879 to Liu el al. A braking controller of a three-phase permanent magnetic (PM) brushless direct current (DC) motor for directly driving a screw pump includes a detection circuit for detecting power supply states of the motor and a braking circuit for controlling the braking startup according to the power supply states of the motor. When the motor is supplied with power, the braking circuit is cut off. When the motor is not supplied with power and the screw pump drives the motor to reverse, the braking circuit starts up.

It is an object of this invention to at least provide a novel method and system for improved braking control for permanent magnet motor driving a progressive cavity pump or other type of pump.

SUMMARY OF THE INVENTION

According to one embodiment of the invention, there is provided a braking controller comprising: receiving a back electromotive force (EMF); at least one electrical contact to a variable frequency drive (VFD); an electrically controlled switch to connect or disconnect a brake resistor from a current flow of the back EMF; the brake resistor dissipating the back EMF as heat; and an electrical control circuit. The electrical control circuit utilizes the back EMF to power the circuit and store a holdup voltage in an energy storage device and determines a rotational speed and a direction of a motor. When a run signal is received on the at least one electrical contact from the VFD, a disconnect signal (e.g. 0V) is transmitted to the electrically controlled switch to disconnect the brake resistor. When the run signal is not received on the at least one electrical contact from the VFD and, if the direction of the motor is in reverse and above a threshold speed, a connect signal (e.g. 15V) is transmitted to the electrically controlled switch to connect the brake resistor. When not receiving the run signal from the VFD and, if the direction of the motor is in reverse and below the threshold speed, dissipating the holdup voltage. The back EMF may be an alternating current (AC) back EMF and a rectifier may convert the alternating current (AC) back electromotive force (EMF) into a direct current (DC) back EMF. The motor may be a permanent magnet (PM) motor and the AC back EMF may be generated from the PM motor. The electrically controlled switch may be a insulated-gate bipolar transistor (IGBT).

According to another aspect of the invention, the motor may drive a progressive cavity (PC) pump using a rod string between the motor and the PC pump. A dissipation time from the energy storage device (e.g. at least one capacitor) through at least the brake resistor may correspond to completely draining a PC pump. The rod string may be assembled using pieces of rod fastened together. The motor may convert 3-phase electrical energy into rotational mechanical energy.

According to yet another aspect of the invention, the braking resistor resistance may be between 0.5Ω and 10Ω or alternatively, may be approximately 4Ω. The electrical control circuit may monitor at least one electrical property of the braking resistor, the at least one electrical property is selected from at least one of: resistance, voltage, current, frequency, and temperature. If the electrical property is abnormal, the braking controller may signal the VFD to stop driving the motor and place the brake controller in a standby mode or a fault mode. A thermistor may detect when the brake resistor is in an overheated state.

According to another aspect of the invention, the back EMF may provide electrical power to at least the electrical control circuit and may be stored in at least one capacitor. At least one power resistor may limit a current from the back EMF to at least the electrical control circuit.

The VFD may convert 3-phase, fixed voltage line power into 3-phase variable frequency, variable voltage, variable current electrical energy for the motor.

According to yet another aspect of the invention, the electrical control circuit may comprise detecting at least one fault condition and signaling the VFD to disable driving of the PC pump. The at least one fault condition may be selected from: faults associated with the brake resistor; faults associated with the rectifier; and faults associated with the electrically controlled switch. The triggered fault may be maintained until a reset switch is initiated.

According to another embodiment of the invention, there is provided a fluid well pump system including a pump driven by a permanent magnet motor (PM motor), which is driven by a variable frequency drive (VFD), a brake resistor is in contact with the PM motor and operation may be controlled by an electronic brake controller. The electronic brake controller is adapted to monitor the back EMF of the PM motor, and if the back EMF is above a predetermined level or within a range, the brake controller makes the connection between the brake resistor and the PM motor, thus engaging the brake. If the back EMF is below the predetermined level, the resistance is disconnected.

According to an embodiment of the invention, there is provided a braking controller having: a rectifier converting an alternating current (AC) back electromotive force (EMF) into a direct current (DC) back EMF; an electrically controlled switch to connect or disconnect a brake resistor from a current flow of the DC back EMF; the brake resistor dissipating the DC back EMF as heat; at least one electrical contact coupled to a variable frequency drive (VFD); and a processor executing instructions from memory. The instructions comprise: monitoring one or more electrical properties of at least one of the brake resistor, the AC back EMF, or the DC back EMF; correlating the one or more electrical properties to a rotational speed and a direction of a permanent magnet (PM) motor; receiving a run signal on the one or more electrical contacts from the VFD and transmitting a signal to the electrically controlled switch to disconnect the brake resistor; receiving a stop signal on the one or more electrical contacts from the VFD and, if the direction of the PM motor is in reverse and above a threshold speed, transmitting a signal to the electrically controlled switch to connect the brake resistor; receiving a stop signal from the VFD and, if the direction of the PM motor is in reverse and below the threshold speed, transmitting a signal to the electrically controlled switch to connect the brake resistor and when the stored energy in the capacitors can no longer hold the electrically control switch closed, allow the switch to open. The electrically controlled switch may correspond to completely draining the PC pump. The AC back EMF may be generated from the PM motor and the PM motor may drive a progressive cavity (PC) pump. The PM motor converts 3-phase electrical energy into rotational mechanical energy. A rod string may be between the PM motor and the PC pump. The rod string may be assembled using pieces of rod fastened together or may be a single shaft of material.

According to some embodiments, the braking resistor may have a resistance between 0.5Ω and 10Ω. In other embodiments the braking resistor is approximately 4Ω plus or minus the tolerance of the particular resistor (e.g. +/−5 percent, +/−10 percent, etc).

The one or more electrical properties of the braking resistor may be selected from at least one of: resistance, voltage, current, frequency, and temperature. If the electrical property is abnormal, the braking controller signals the VFD to stop driving the PM motor and may place the brake controller in a standby or fault mode.

According to another aspect of the invention, the DC back EMF may provide electrical power to at least the processor and the memory. One or more capacitors may store energy from the DC back EMF and one or more power resistors may limit a current from the DC back EMF to the processor and the memory or additional electrical components.

According to yet another aspect of the invention, the electrically controlled switch may be a insulated-gate bipolar transistor (IGBT).

According to another aspect of the invention, the VFD may convert 3-phase, fixed voltage line power into 3-phase variable frequency, variable voltage, variable current electrical energy for the PM motor.

According to yet another aspect of the invention, the instructions may detect at least one fault condition and signaling the VFD to disable driving of the PC pump. The at least one fault condition is selected from at least one of: faults associated with the brake resistor; faults associated with the rectifier; and faults associated with the electrically controlled switch. The at least one fault may be maintained until a reset switch is initiated.

According to any aspect of the invention, a thermistor may detect when the brake resistor is in an overheated state.

According to another aspect of the invention, there is provided a permanent magnet motor system comprising: a variable frequency drive (VFD) powering a permanent magnet (PM) motor driving a progressive cavity (PC) pump, the VFD having at least one electrical contact with a braking controller; and the braking controller comprising: a rectifier converting an alternating current (AC) back electromotive force (EMF) into a direct current (DC) back EMF; an electrically controlled switch to connect or disconnect a brake resistor from a current flow of the DC back EMF; the brake resistor dissipating the DC back EMF as heat; a processor executing instructions from memory, the instructions comprise: monitoring at least one electrical property of the brake resistor, AC back EMF, or DC back EMF; correlating the at least one electrical property to a rotational speed and a direction of a permanent magnet (PM) motor; receiving a run signal on the at least one electrical contact from the VFD and transmitting a disconnect signal to the electrically controlled switch to disconnect the brake resistor; when not receiving the run signal on the at least one electrical contact from the VFD and, if the direction of the PM motor is in reverse and above a threshold speed, transmitting a connect signal to the electrically controlled switch to connect the brake resistor; when not receiving the run signal from the VFD and, if the direction of the PM motor is in reverse and below the threshold speed, transmitting the connect signal to the electrically controlled switch to connect the brake resistor and when the stored energy in the capacitors can no longer control the electrically control switch, allow the switch to open.

BRIEF DESCRIPTION OF THE DRAWINGS

An embodiment will now be described, by way of example only, with reference to the attached Figures, wherein:

FIGS. 7A and 7B show exemplary controller logic for fault conditions.

DETAILED DESCRIPTION OF THE EMBODIMENT

While the Background of Invention described above has identified particular problems known in the prior art, the present invention provides, in part, a new and useful application for braking and brake control for a pump with a permanent magnet motor.

Figure 1:
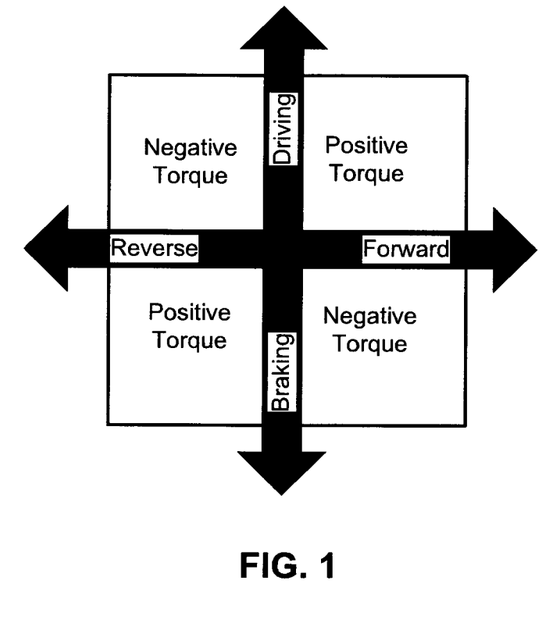
FIG. 1 shows a torque map showing the relationship between driving/braking and forward/reverse rotation.

Referring to FIG. 1, the relationship between driving/braking and movement in the forward/reverse directions is illustrated for ease of understanding. As shown, there is positive torque in the system when driving forward or when braking in reverse. When driving in reverse or braking forward, there is negative torque. An electronic brake system which only enables braking when back spin is present, and that is when the drive is rotating backwards, or in the reverse braking quadrant is shown in FIG. 1.

In broad terms, the embodiments herein selectively connect the PM motor 202 back EMF with a brake resistor 206. If the brake resistor 206 is not present, then no braking can occur. The brake resistor 206 is between 0.5Ω and 10Ω but in this embodiment it is approximately 4Ω (+/−5% or 10% tolerances). Other larger resistances for brake resistor 206 are possible for systems 200 that require different braking properties. In general, if braking resistance is low (e.g. 0.5Ω) then the braking torque is higher at lower speeds. Whereas, if the braking resistance is higher (e.g. 10Ω or higher), then the braking torque is lower at lower speeds. The brake controller 204 comprises electrical circuitry that senses and reacts to the status of the brake resistor 206. The brake controller 204 determines if the brake resistor 206 is present and whether or not the brake resistor 206 is isolated from ground or shorted to ground. Additionally, the brake controller 204 may monitor one or more electrical properties of the brake resistor 206 such as the value of the resistance, voltage, temperature, frequency, and/or current. Alternatively or in addition, the brake controller 204 may monitor one or more electrical properties of the back EMF such as voltage, frequency, and/or current.

Figure 2:
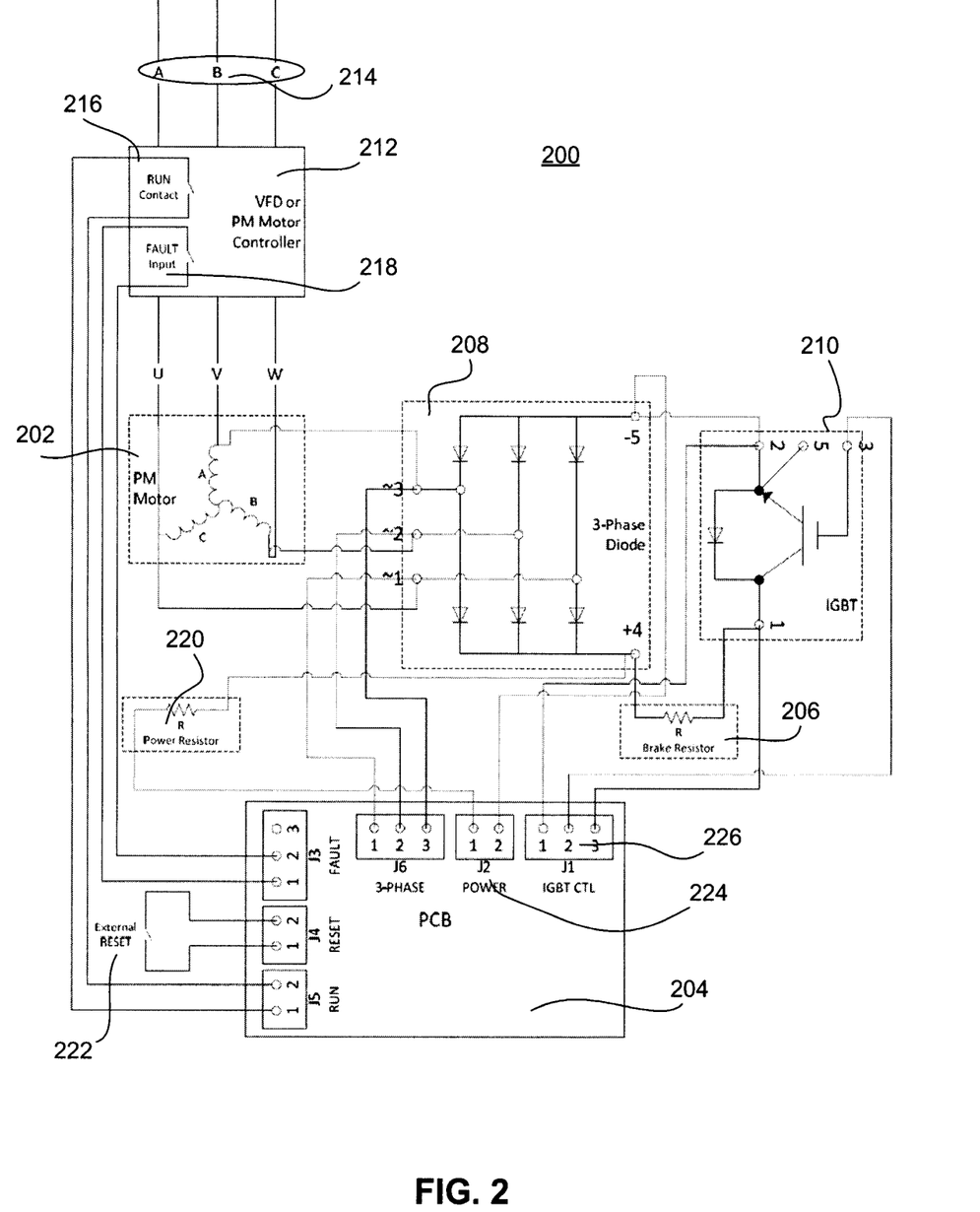
FIG. 2 shows a schematic drawing of a system according to an embodiment of the invention.
Figure 3:
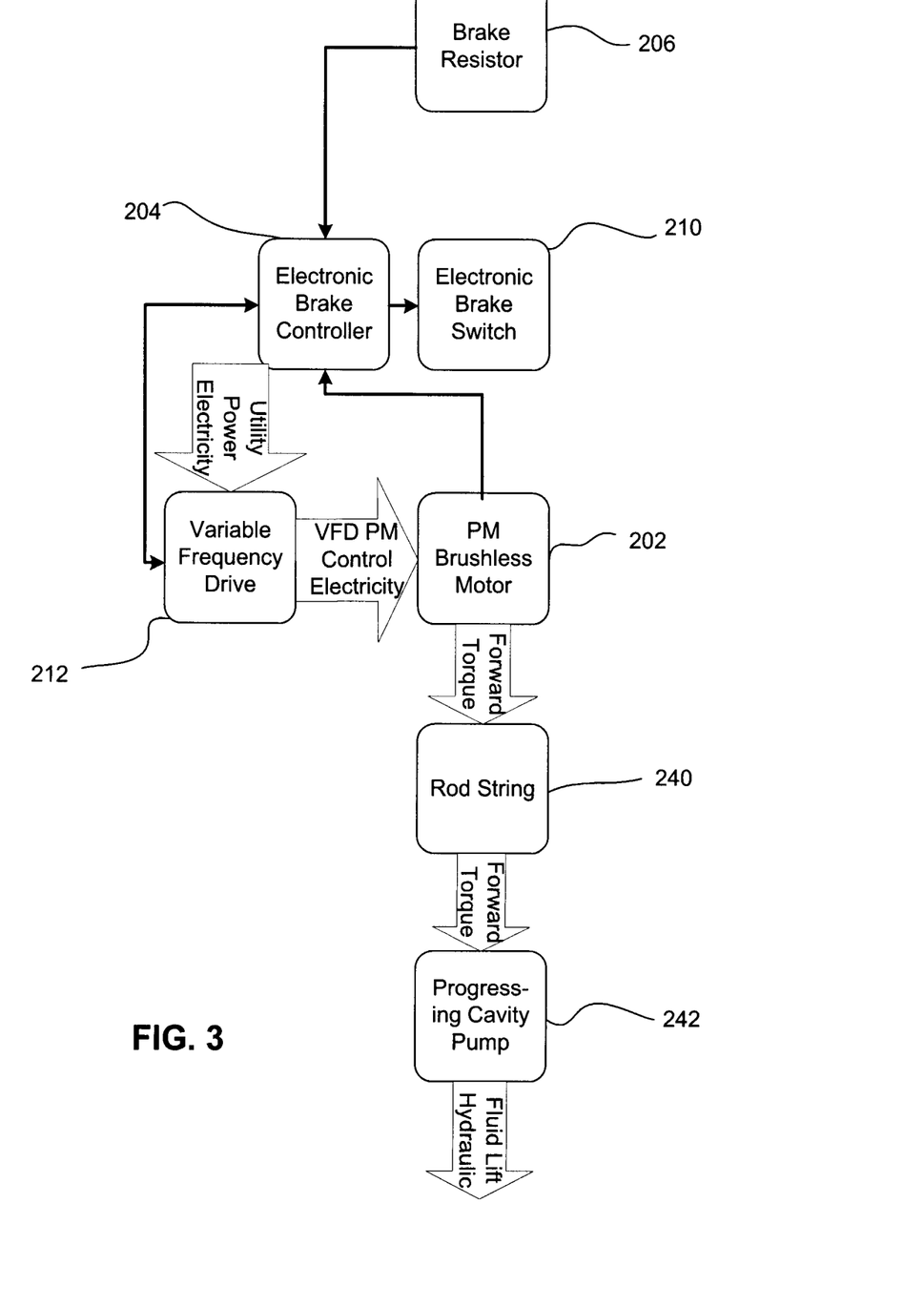
FIG. 3 shows an energy flow and control diagram during forward driving.
Figure 4:
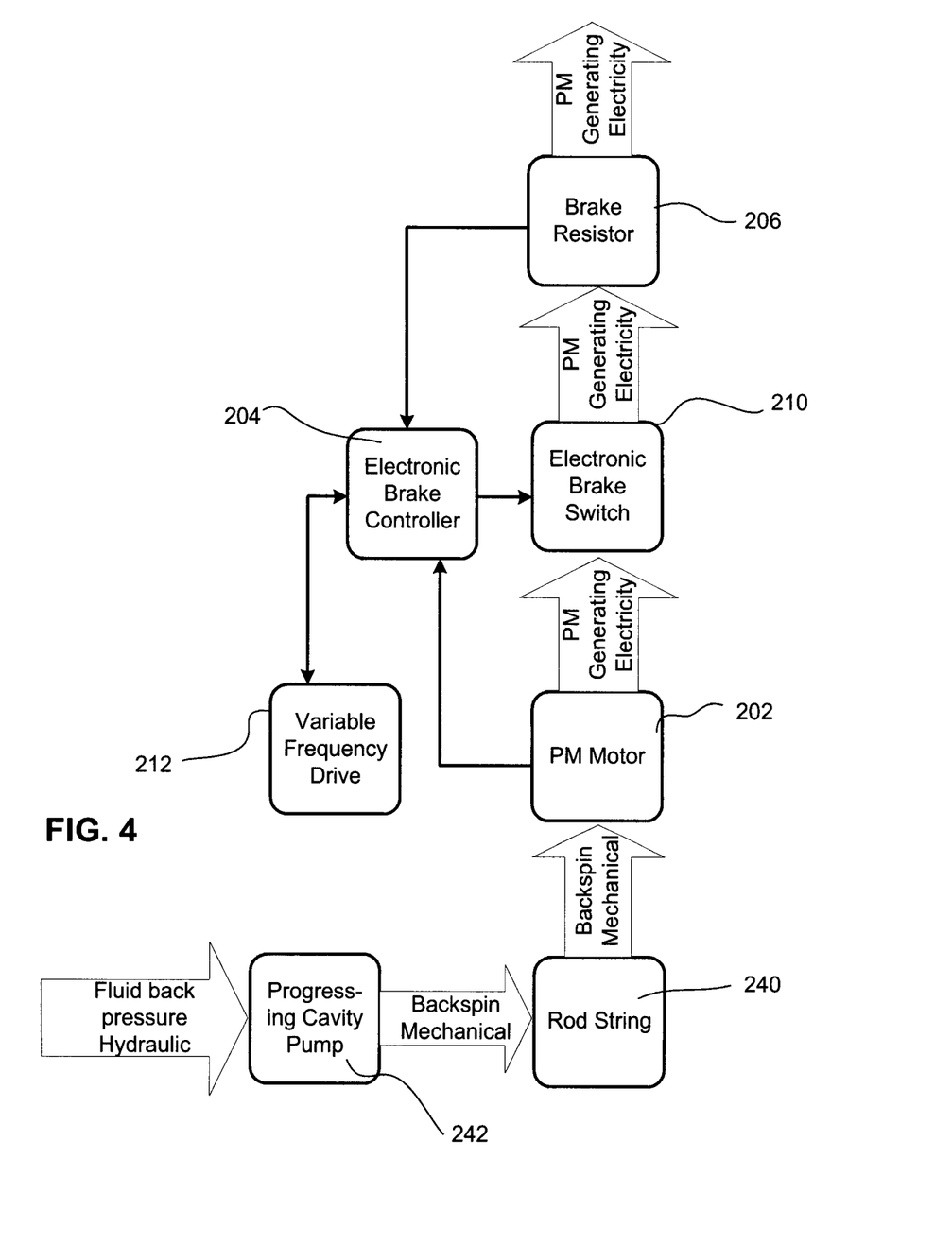
FIG. 4 shows an energy flow and control diagram during reverse braking.

One example of a system 200 in which the invention is contemplated to be used is shown schematically in FIGS. 2, 3, and 4. A permanent magnetic motor or PM motor 202 is in a top direct drive configuration to a rod string 240. The rod string 240 is assembled using short pieces of rod that are fastened together with screw threads or other fastening mechanism. The rod string 240 mechanically drives a progressive cavity (PC) pump 242 to extract fluid from a well. Alternatively, the rod string 240 may be constructed of a single continuous rod. The PM motor 202 converts 3-phase electrical energy into rotating mechanical energy using a conventional permanent magnet architecture. In backspin, and while braking, the PM motor 202 converts rotating mechanical energy into 3-phase electric energy as shown in FIG. 4.

An electronic brake controller 204 provides control of the braking elements and is in communication with the PM motor 202 and the brake resistor 206. The brake resistor 206 converts electric energy into heat. Any time the PM motor 202 is rotating, there is back EMF produced. If the back EMF is connected to the brake resistor 206, the VFD 212 may measure this as a load. The brake controller 204 connects the brake resistor 206 and the PM motor 202 at the right time and under the right conditions, as will be discussed further below. Optionally, the brake controller 204 may also monitor the status of the brake resistor 206, and in particular it monitors whether the brake resistor 206 has failed. If the brake resistor 206 has failed, operation of the motor 202 is halted as safely as possible, or in the alternative, the motor 202 is not permitted to start operation. The braking effort is dependent on the rotational direction. The brake resistor 206 may further comprise a brake resistor thermistor (not shown) that senses whether or not the brake resistor 206 is in an overheated state. If the thermistor senses an overheated state, a fault may be initiatied as described further below.

The brake controller 204 also includes a 3-phase diode 208 which converts (e.g. rectifies) the 3-phase AC operation to DC operation. The brake controller 204 preferably comprises a 3-phase diode that permits the motor 202 to output DC voltage, and an insulated-gate bipolar transistor (IGBT) 210 (e.g. an electrically controlled switch) which connects the output DC voltage to the brake resistor 206. The brake resistor 206 in communication with the IGBT 210 then converts the back EMF electric energy into heat.

The system 200 also includes a variable frequency drive (VFD) 212 which drives the PM motor 202. The VFD 212 converts 3-phase, fixed voltage line power 214 into a form of electrical energy acceptable to the PM motor 202 such as an alternate 3-phase variable frequency, variable voltage, variable current electrical energy source capable of controlling the PM motor 202. An output filter (not shown) may be provided with some VFDs to manage electrical noise produced by the VFD as it converts electrical utility energy into a form directly usable by the PM motor 202.

The brake controller 204 is also adapted to operate in a standby mode when the VFD 212 is operating the PM motor 202 and to operate in a ready mode when the VFD 212 is not operating the PM motor 202. This can be implemented by way of a 'RUN' contact 216, which is closed when the VFD 212 is controlling the PM motor 202 and opened when the VFD 212 is not controlling the motor 202. The brake controller 204 may be powered by the voltage produced by the back EMF from the PM motor 202 via terminals 224. A power resistor 220 reduces the current from the back EMF to prevent damage to the brake controller 204. The brake controller 204 has capacitors (not shown) within its internal power supply that are charged with the back EMF. Since the back EMF varies linearly with the speed of the motor 202, the voltage generated has a wide range such as 415 VAC at 450 rotations-per-minute (rpm). Once the capacitors are charged, a low amount of energy is required to maintain the brake controller 204. When the back EMF drops, the capacitors continue to provide power to the brake controller 204. Depending on the level of the back EMF voltage, the controller 204 either connects or disconnects the brake resistor 206 through a gate drive integrated circuit by way of contact 226 that provides a voltage to close the IGBT 210 and removes the voltage to open the IGBT 210. If the brake resistor 206 is operational, the IGBT 210 can be closed and if non-operational, the IGBT 210 can be opened.

The brake connection is dependent on the 'RUN' contact 216 and the state of PM motor 202 rotation (bidirectional). A closed 'RUN' contact 216 means that the VFD 212 is controlling the motor 202. An open 'RUN' contact 216 means that the VFD 212 is not controlling the motor 202. The state of the 'RUN' contact 216 may not coincide with the state of utility power 214. The 'RUN' contact 216 can be closed or open if utility power 214 is present. When utility power 214 is not present, the 'RUN' contact 216 may or may not be closed or open depending on the system state.

A closed 'RUN' contact 216 ensures that signals are connected to remove the ready state of the brake. Generally, the 'RUN' contact 216 state identifies if the brake controller 204 is in a 'Stand By' or a 'Ready' state. A closed 'RUN' contact 216 causes the brake controller 204 to maintain a disconnected brake (e.g. Stand By state). An open 'RUN' contact 216 allows the brake controller 204 to alter its behavior depending on the rotation state of the motor 202 as shown further in FIG. 5A.

If the brake controller 204 is in a Ready state and the PM motor 202 is rotating or has been rotating above ~50 rpm in reverse rotation, the brake controller 204 changes to an 'Operating' state. An Operating state is where the PM motor 202 is connected to the brake resistor 206 applying a positive torque. The speed that the controller 204 uses to switch could be adjusted up or down. The sensing method can be by voltage or by frequency.

The default state of the brake is disconnected. The brake resistor 206 connects when voltage is present which is signified by a rotating motor 202. The brake connects only when the 'RUN' contact 216 is open and if the brake controller 204 is in a Ready state. If the components fail, the brake controller 204 fails to a connected state meaning the VFD 212 overloads and is not be able to sustain rotation of the motor 202.

Figure 5A:
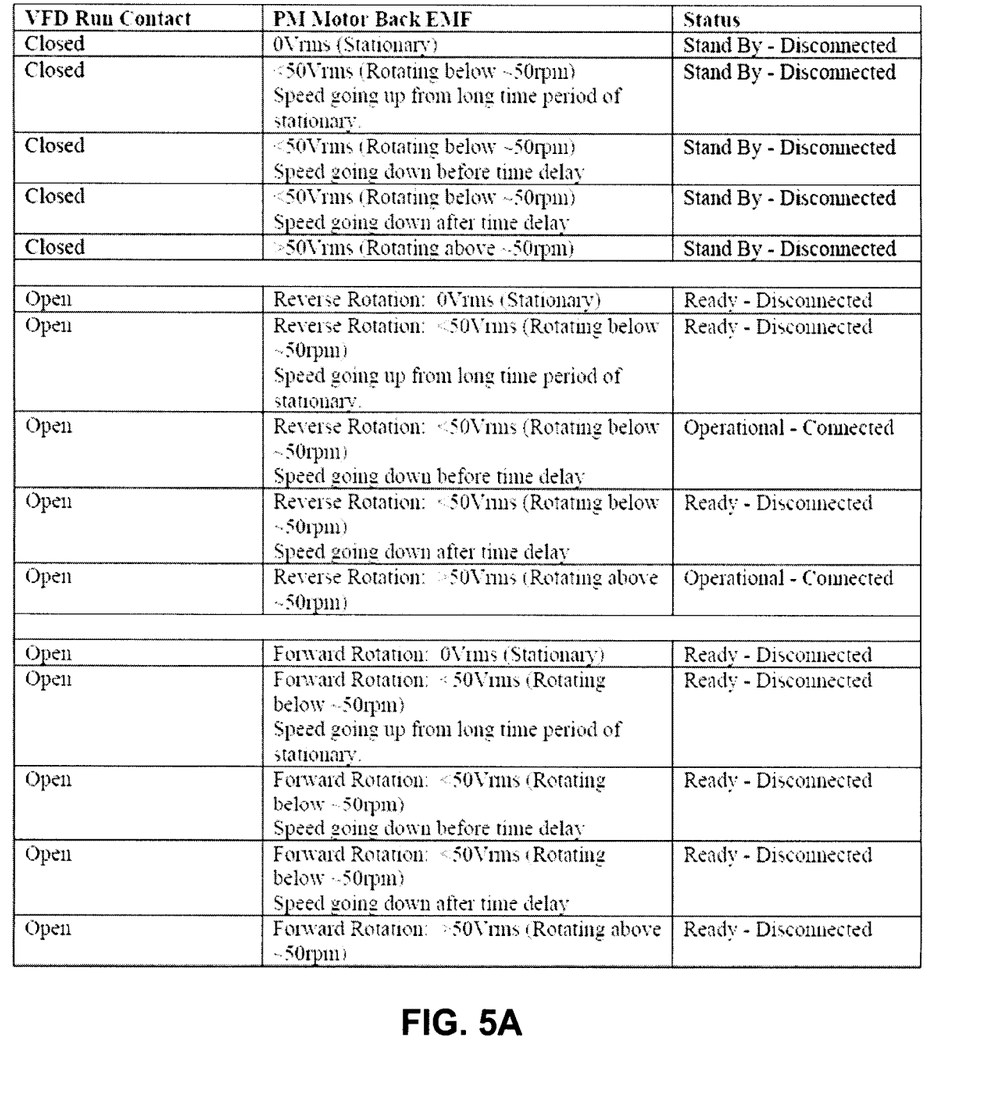
FIGS. 5A and 5B shows exemplary controller logic for operating the brake.
Figure 5B:
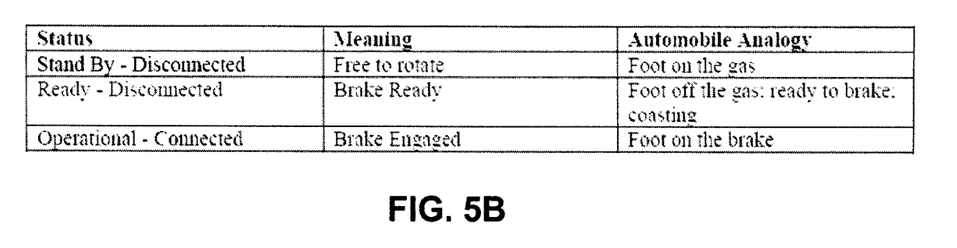

FIG. 5A shows chart of an exemplary controller logic of the brake connection depending on the 'RUN' contact 216 and the rotation state of the PM motor 202. The explanation of each Brake Status in FIG. 5A is further defined with reference to FIG. 5B. When the VFD Run Contact 216 is in a closed position, the VFD 212 is actively controlling the PM motor 202. In this condition, the back EMF charges the brake controller 204 when the speed is non-stationary and the brake controller 204 disconnects the brake resistor 206 (e.g. Stand By state). When the Run Contact 216 opens (e.g. disconnects the Run signal), the PM motor 202 and brake controller 204 are placed in a Ready State where braking may be initiated. The brake controller 204 connects the brake resistor 206 when the motor is in reverse rotation when the back EMF is greater than 50 Vrms (e.g. the motor 202 is instructed to slow down and brake) and also when less than 50 Vrms before the holdup voltage in the electronic controller has dissipated, indicating that the remaining fluid in the pump 242 has been drained. A set of capacitors (not shown), or other energy storage device, maintain the power supply of the brake controller 204 for a period of time (e.g. time delay) in order for the remaining fluid in the pump 242 to be removed. The period of time is determined by the size of the capacitors. When the system exceeds 50 Vrms from 0 Vrms, then the controller 200 knows that the speed has increased. When the capacitors discharge at low speed (Vrms has fallen below 50 Vrms), then the speed has reduced. It is possible for the system 200 to physically speed up and reduce crossing the 50 Vrms threshold multiple times during a braking event as described further below.

Depending on the VFD 212 capability, the 'RUN' contact 216 can be closed when utility power 214 is absent. The VFD 212 can recycle power from the motor 202 (acting as a generator) and reapply the power to the motor 202 (acting to resist an increase in speed). For VFDs 212 that do not have this capability, the brake controller 204 does not require this functionality in order to operate.

Additionally, the brake contact disengages below ~50 rpm because this disengagement allows the PC pump 242 to completely drain for maintenance work without storing potential energy in the rod string 240. If the brake is 'always on', it is possible for some fluid energy to be stored above the pump 242. The brake controller 204 lets the fluid drain completely. A period of time needs to pass below approximately 50 rpm before the brake disengages. A set of capacitors or other energy source (not shown) provide a holdup voltage when the back EMF is too low to power the brake controller 204. In the present embodiment, the time delay is 2 to 10 minutes. If the viscous fluid builds up (by draining from the well bore) after the brake has disconnected and the pump 242 begins to rotate greater than ~50 rpm, the brake reengages (connect).

Figure 7A:
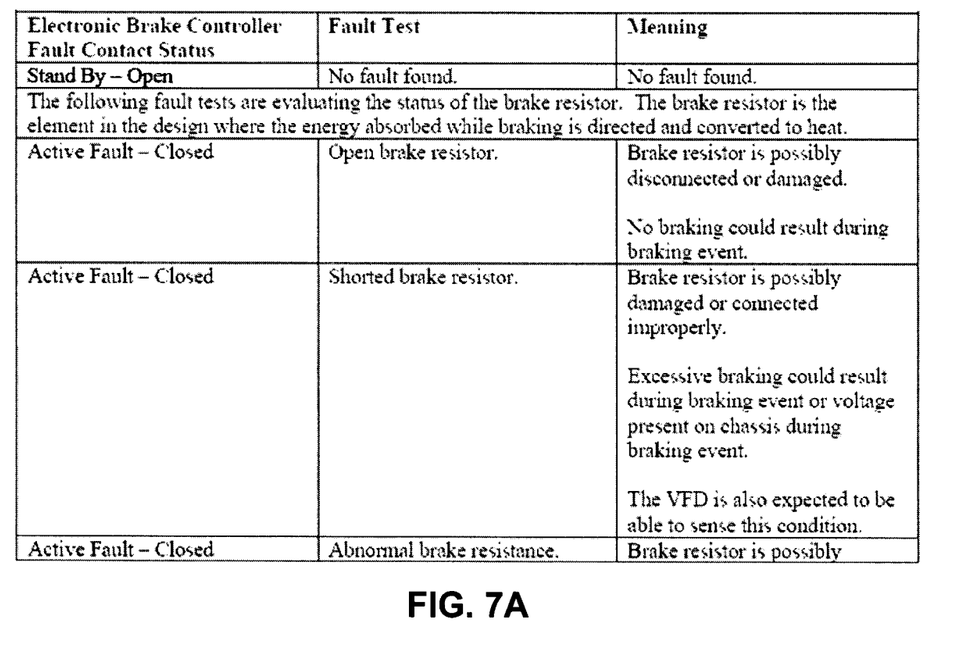

The brake controller 204 may, in some embodiments, detect various fault conditions with the system 200 and convey these fault conditions to the VFD 212. When a fault is detected, the VFD 212 is instructed to reduce and/or stop providing power to the motor 202 in a safe manner. If the motor 202 is stationary, the fault condition prevents the VFD 212 from starting the motor 202. A notification may be provided to operator by way of an light emitting diode (LED), computer display, or other indicator. Example fault conditions are demonstrated in FIGS. 7A and 7B. The fault conditions may be divided into several major categories such as faults associated with the brake resistor 206; faults associated with the rectifier 208; faults associated with the IGBT 210; and faults associated with the brake resistor thermistor. The brake controller 204 may latch the fault condition in order to maintain its status through a power cycle (e.g. the brake controller 204 losing power). The operator may clear the fault using an external reset switch 222.

Figure 6:
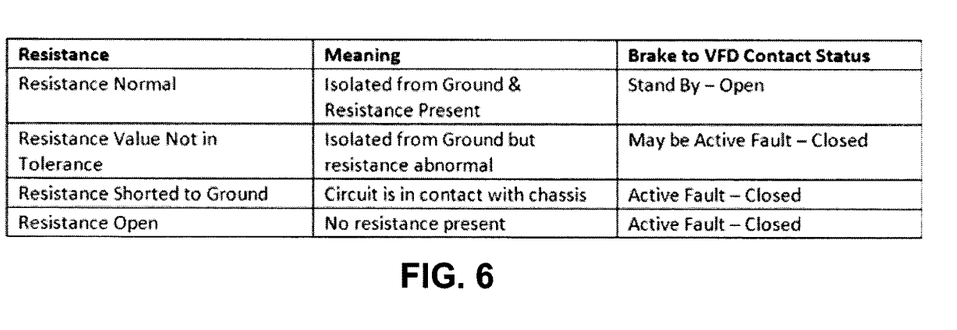
FIG. 6 shows exemplary controller logic for brake resistor conditions according to an embodiment of the invention.

Faults associated with the brake resistor 206 may detect a damaged or disconnected brake resistor 206, a shorted brake resistor 206, or abnormal brake resistance. FIG. 6 shows a representation of checking the status of the brake resistor 206. If the brake resistor 206 is shorted to ground, then the braking action may be very high torque or may be unpredictable. If the brake resistor 206 has infinite resistance then the brake resistor 206 is not present and no braking occurs. However, the brake resistance influences how the system brakes. High torque, low speed braking is possible with a low resistance. Low torque, high speed braking is possible with a higher resistance.

Faults associated with an IGBT 210 are detected via a process where on startup of the system 200, the VFD 212 manipulates the brake controller 204 in unison with running the motor 202 to sense a change of the VFD 212 load. This process enables determination of whether the IGBT 210 is within suitable parameters.

Although the PM motor 202 described herein converts 3-phase electric energy into rotating mechanical energy, the PC motor 202 can be both an AC synchronous PM motor 202 or a DC brushless PM motor 202 such that the rotor is constructed with surface mount permanent magnets or interior permanent magnets. The embodiments herein work with any AC PM motor 202 that produces a sinusoidal back EMF when supplied with rotational energy. The brake controller 204 also works with any DC brushless PM motor 202 that produces a trapezoidal (or rectangular) back EMF when supplied with rotational energy.

Although the embodiments described herein have the brake controller 204 powered by the back EMF, other power supplies are possible such as using the 24V power supply included with the VFD 212. Alternatively, the brake controller 204 may use the DC bus of the VFD 212. These two power supplies provide a more stable voltage to the brake controller 204 allowing the brake controller 204 to be constructed with a reduced number of components. In other embodiments, the power to the brake controller 204 may be supplied by a solar panel, wind turbine, rechargeable battery, etc.

Although the energy storage devices described herein are capacitors, other energy storage devices are possible such as inductors, flywheels, rechargeable batteries, etc.

Although connect and disconnect signals are described, the disconnect signal may simply be the absence of the connect signal. Alternatively, the connect signal may be a 4-20 mA signal where the disconnect signal may be 4 mA and the connect signal may be 20 mA. In some configurations, the connect and disconnect signals may be inverted (e.g. active-low rather than active-height).

Although the embodiments described herein have a single brake resistor 206, alternative embodiments may have more than one brake resistor 206 in order to more efficiently dissipate the heat from the resistor. Additionally, or alternatively, the brake resistor 206 may further comprise a heat sink or other type of heat dissipation device such as a liquid cooling system. Additionally, or alternatively, the IGBT 210 may also comprise a heat sink or other type of heat dissipation device.

Although the embodiments described herein reference a rotational speed of 50 rpms, other rotational speeds may be used particular to the circumstances such as viscosity of the fluid, depth of the well, size of the PM motor, etc.

Although the brake controller 204 is described herein as electrical circuitry to accomplish the operation, the brake controller 204 may comprise at least one processor executing instructions from memory to control and convert signals from the other system components. The controller may also be demonstrated as printed circuit boards with a processor and memory, various implementations of the systems and techniques can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. For example, memory may comprise flip-flops retaining state information such as remembering fault states.

The controllers may execute computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Although the period of time to empty the pump 242 is provided with a set of capacitors, in an alternative embodiment, a timer may be provided corresponding to the period of time (e.g. time delay). The timer may expire by starting at a particular non-zero value and decrement to zero. The timer may also expire by starting at zero and incrementing to reach a particular non-zero value. The timer may increase or decrease by a fraction, whole number, or multiples. The period set on the timer within the processor may be based on the particular parameters of the pump 242 (e.g. pump size, rpm, etc). The timer may not be specific and may be adjusted.

An operator may interact with the systems and techniques using a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The above-described embodiments are intended to be examples of the present invention and alterations and modifications may be effected thereto, by those of skill in the art, without departing from the scope of the invention, which is defined solely by the claims appended hereto.

What is claimed is:

1. A braking controller comprising:
   an energy storage device for storing a back electromotive force (EMF), at least one electrical contact to a motor controller;
   an electrically controlled switch to connect or disconnect a brake resistor from a current flow of the back EMF; the brake resistor dissipating the back EMF as heat; and
   an electrical control circuit configured to:
   store the back EMF within said energy storage device;
   determine a rotational speed and a direction of a motor;
   when receiving a run signal on the at least one electrical contact from the motor controller, transmit a disconnect signal to the electrically controlled switch to disconnect the brake resistor; and
   in absence of the run signal on the at least one electrical contact from the motor controller, determine if the direction of the motor is in reverse, and only after a determination that the direction of the motor is in reverse, transmit a connect signal to the electrically controlled switch to connect the brake resistor, whereby said connect signal is not transmitted if the determined motor direction during said absence of the run signal is a forward direction;
   wherein the transmitting of the connect signal occurs when the motor is above a threshold speed, and the electrical control circuit is further configured to: when the motor is below the threshold speed, dissipate the back EMF stored within the energy storage device through at least the brake resistor, and once the energy storage device is depleted, release the connect signal to disconnect the brake resistor.

2. The braking controller according to claim 1, wherein the back EMF is an alternating current (AC) back EMF and the brake controller further comprises a rectifier converting the alternating current (AC) back electromotive force (EMF) into a direct current (DC) back EMF.

3. The braking controller according to claim 2, wherein the motor is a permanent magnet (PM) motor and the AC back EMF is generated from the PM motor.

4. The braking controller according to claim 1, wherein the braking resistor is between 0.5Ω and 10Ω.

5. The braking controller according to claim 1, wherein the braking resistor is approximately 4Ω.

6. The braking controller according to claim 1, wherein the electrical control circuit is further configured to monitor at least one electrical property of the braking resistor or the back EMF, the at least one electrical property being selected from at least one of: resistance, voltage, current, frequency, and temperature.

7. The braking controller according to claim 6, wherein if the electrical property is abnormal, the braking controller signals the motor controller to stop driving the motor.

8. The braking controller according to claim 7, wherein the electrical control circuit is further configured to place the brake controller in a standby mode or a fault mode.

9. The braking controller according to claim 1, wherein the energy storage device provides electrical power to at least the electrical control circuit.

10. The braking controller according to claim 9, further comprising at least one power resistor limiting a current from the back EMF to at least the electrical control circuit.

11. The braking controller according to claim 1, wherein the electrically controlled switch comprises a insulated-gate bipolar transistor (IGBT).

12. The braking controller according to claim 1, wherein the electrically controlled switch comprises a solid state contactor.

13. The braking controller according to claim 12, wherein the resistor has a three-phase AC resistance, wherein the resistance of each phase is between $0.5\Omega$ and $10\Omega$.

14. The braking controller according to claim 1, wherein the motor controller converts 3-phase, fixed voltage line power into 3-phase variable frequency, variable voltage, variable current electrical energy for the motor.

15. The braking controller according to claim 1, wherein the motor drives a progressive cavity (PC) pump and a dissipation time from the energy storage device through at least the brake resistor corresponds to draining the PC pump.

16. The braking controller of claim 1 wherein said energy storage device comprises at least one capacitor.

17. A braking controller comprising:
an energy storage device for storing a back electromotive force (EMF);
at least one electrical contact to a motor controller;
an electrically controlled switch to connect or disconnect a brake resistor from a current flow of the back EMF; the brake resistor dissipating the back EMF as heat; and
an electrical control circuit configured to:
store the back EMF within said energy storage device;
determine a rotational speed and a direction of a motor;
when receiving a run signal on the at least one electrical contact from the motor controller, transmit a disconnect signal to the electrically controlled switch to disconnect the brake resistor; and
in absence of the run signal on the at least one electrical contact from the motor controller, determine if the direction of the motor is in reverse, and only after a determination that the direction of the motor is in reverse, transmit a connect signal to the electrically controlled switch to connect the brake resistor, whereby said connect signal is not transmitted if the determined motor direction during said absence of the run signal is a forward direction;
wherein:
the motor drives a progressive cavity (PC) pump and the electrical control circuit further comprising detecting at least one fault condition and signaling the motor controller to disable driving of the PC pump; and
the braking controller is further characterized by at least one of the following characterizations:
(a) that the at least one fault condition is selected from at least one of: faults associated with the brake resistor; faults associated with the rectifier; and faults associated with the electrically controlled switch; and/or
(b) that the braking controller further comprises a thermistor that initiates the at least one fault condition when the brake resistor is in an overheated state.

18. The braking controller according to claim 17, characterized by characterization (a).

19. The braking controller according to claim 17, wherein the at least one fault is maintained until a reset switch is initiated.

20. The braking controller according to claim 17, characterized by characterization (b).

21. A braking controller comprising:
a rectifier converting an alternating current (AC) back electromotive force (EMF) into a direct current (DC) back EMF;
an electrically controlled switch to connect or disconnect a brake resistor from a current flow of the DC back EMF; the brake resistor dissipating the DC back EMF as heat;
at least one electrical contact coupled to a motor controller;
a processor executing instructions from memory, the instructions comprise:
monitoring at least one electrical property of at least one of the brake resistor, the DC back EMF, or the AC back EMF;
correlating the at least one electrical property to a rotational speed and a direction of a permanent magnet (PM) motor;
receiving a run signal on the at least one electrical contact from the motor controller and transmitting a disconnect signal to the electrically controlled switch to disconnect the brake resistor; and
in absence of the run signal on the at least one electrical contact from the motor controller, determining whether the direction of the PM motor is in reverse, and only after a determination that the direction of the motor is in reverse, transmitting a connect signal to the electrically controlled switch to connect the brake resistor, whereby said connect signal is not transmitted if the determined motor direction during said absence of the run signal is a forward direction;
wherein the transmitting of the connect signal occurs when the PM motor is above a threshold speed, and the instructions further comprise: when the PM motor is below the threshold speed, initiating a timer; and transmitting the connect signal to the electrically controlled switch to connect the brake resistor until the timer expires.

22. A permanent magnet motor system comprising:
a motor controller powering a permanent magnet (PM) motor driving a progressive cavity (PC) pump, the motor controller having at least one electrical contact with a braking controller; and
the braking controller comprising:
a rectifier converting an alternating current (AC) back electromotive force (EMF) into a direct current (DC) back EMF;
an electrically controlled switch to connect or disconnect a brake resistor from a current flow of the DC back EMF; the brake resistor dissipating the DC back EMF as heat;
a processor executing instructions from memory, the instructions comprise:
monitoring at least one electrical property of at least one of the brake resistor, the DC back EMF, or the AC back EMF;
correlating the at least one electrical property to a rotational speed and a direction of a permanent magnet (PM) motor;
receiving a run signal on the at least one electrical contact from the motor controller and transmitting a disconnect signal to the electrically controlled switch to disconnect the brake resistor;
when not receiving the run signal on the at least one electrical contact from the motor controller and, if the direction of the PM motor is in reverse and above a threshold speed, transmitting a connect signal to the electrically controlled switch to connect the brake resistor;

when not receiving the run signal from the motor controller and, if the direction of the PM motor is in reverse and below the threshold speed, initiating a timer; and transmitting the connect signal to the electrically controlled switch to connect the brake resistor until the timer expires and then transmitting a disconnect signal to disconnect the brake resistor.

\* \* \* \* \*